(12) United States Patent
Lors

(10) Patent No.: US 7,953,441 B2
(45) Date of Patent: May 31, 2011

(54) HAND HELD MOBILE COMMUNICATION DEVICE AND METHOD FOR MANAGING PRINTED DOCUMENTS

(76) Inventor: Edner Lors, Bridgeport, CT (US)

( * ) Notice: Subject to any disclaimer, the term of this patent is extended or adjusted under 35 U.S.C. 154(b) by 722 days.

(21) Appl. No.: 12/005,454

(22) Filed: Dec. 27, 2007

(65) Prior Publication Data

US 2008/0182620 A1    Jul. 31, 2008

Related U.S. Application Data

(60) Provisional application No. 60/882,329, filed on Dec. 28, 2006.

(51) Int. Cl.
*H04M 1/00* (2006.01)
*H04B 1/38* (2006.01)

(52) U.S. Cl. .................. 455/557; 455/556.1; 455/575.3; 455/566; 455/90.3; 455/550.1; 455/575.1; 455/564; 379/433.11; 379/434.04; 379/433.13; 701/23; 235/454; 235/472.01; 358/473; 358/497

(58) Field of Classification Search .................. 455/557, 455/556.1, 566, 90.3, 550.1, 575.1, 564, 455/575.3; 235/454, 472.01; 358/473–474, 358/497; 379/433.11, 433.12
See application file for complete search history.

(56) References Cited

U.S. PATENT DOCUMENTS

| | | | |
|---|---|---|---|
| 5,568,820 A | | 10/1996 | Dirksing |
| 6,587,231 B1 * | | 7/2003 | Sung .............................. 358/497 |
| 6,978,939 B2 * | 12/2005 | Russell et al. ........... 235/472.01 |
| 7,079,864 B2 * | 7/2006 | Engstrom et al. ............. 455/557 |
| 7,126,626 B2 * | 10/2006 | Sawahara et al. .......... 348/14.02 |
| 7,155,266 B2 | 12/2006 | Stefansen |
| 7,162,283 B2 | 1/2007 | Bae et al. |
| 7,309,015 B2 * | 12/2007 | Frantz et al. ............. 235/462.46 |
| 7,364,077 B2 * | 4/2008 | Wolf, II ......................... 235/454 |
| 7,414,834 B2 * | 8/2008 | Ukonaho et al. .......... 361/679.55 |
| 7,443,979 B2 * | 10/2008 | Kim ......................... 379/433.12 |
| 7,496,388 B2 * | 2/2009 | Kim ........................... 455/575.4 |
| 7,660,411 B2 * | 2/2010 | Oi ............................. 379/433.12 |
| 7,681,800 B2 * | 3/2010 | Silverbrook et al. .... 235/472.01 |
| 7,761,124 B2 * | 7/2010 | Huang et al. ............... 455/575.4 |
| 2002/0169509 A1 * | 11/2002 | Huang et al. .................... 700/66 |
| 2002/0196477 A1 * | 12/2002 | Chen ............................. 358/474 |
| 2007/0145113 A1 * | 6/2007 | Keller et al. .................. 235/377 |

* cited by examiner

*Primary Examiner* — Marceau Milord
(74) *Attorney, Agent, or Firm* — James Ray & Assoc

(57) ABSTRACT

A hand held mobile communication device includes a housing, a scanner disposed on one surface of the housing and a display provided on an opposed surface of the housing, whereby an image being scanned by the scanner is displayed on the display. A second housing may be provided and attached to the first housing with a hinge that enables 360 degree rotation of one housing relative to another. The device is employable for managing printed documents by scanning them with the scanner, viewing scanned documents on the display and transmitting the documents in a digital format to a remote location. A second display is also provided on an outer surface of the second housing. The device includes a camera for capturing still images and another camera for capturing video. Operating keys are employed and provide for one step operation of various features of the device.

18 Claims, 3 Drawing Sheets

HAND HELD MOBILE COMMUNICATION DEVICE AND METHOD FOR MANAGING PRINTED DOCUMENTS

CROSS-REFERENCE TO RELATED APPLICATIONS

This application is related to and claims priority from U.S. Provisional Patent Application Ser. No. 60/882,329 filed on Dec. 28, 2006.

FIELD OF THE INVENTION

The present invention relates, in general, to mobile communication devices and, more particularly, this invention relates to a multifunctional hand held mobile communication device that enables the user to manage printed documents by scanning them with a built-in scanner, viewing scanned documents on a built-in display and transmitting the documents in a digital format to a remote location.

BACKGROUND OF THE INVENTION

As is generally well known, printed media remains one of the main vehicles for a person to receive news and other information of interest. While there is a proliferation of an Internet-based content, many still prefer to print such web content and read the printed document. Printed media is also prevalent in business environment, being related to contracts, agreements, presentation material, photographs, technical documentation and the like. It is also well known that a considerable amount of effort is spent on managing printed media, either printing, copying and distributing printed materials and documents or scanning them into electronic format for ease of storage and retrieval and for later distribution over Internet. Prior to the development of the present invention, scanning of printed media required dedicated scanning equipment. However, stationary scanners are not readily and conveniently available at a time of need while portable scanners are often large and inconvenient to carry particularly by business travelers, generally require a flat surface to rest on for optimum performance and often require immediate connection to a computer in order to store scanned images.

Therefore, there is a need for an improved multifunctional hand held mobile communication device and method for managing documents.

SUMMARY OF THE INVENTION

The invention provides a hand held mobile electronic communication device having a housing. An improvement to the device includes a scanner disposed on one surface of the housing and a display provided on an opposed surface of the housing, whereby an image being scanned by the scanner is displayed on the display during scanning effort.

The invention also provides a mobile communication device having a first and a second housing and a hinge pivotally connecting the first and second housing and enabling a 360 degree rotation relative to one another, wherein inner surface of the first and second housing being invisible from outside in a closed state of the device, and wherein outer surface of the first and second housing being invisible from outside in an open state of the device.

The invention additionally provides a method of managing printed documents. The method includes the step of providing a scanner in a hand held mobile electronic communication device having a display disposed on one surface thereof. Then, positioning the scanner at a predetermined distance above a printed document to be scanned. Next, activating the scanner to scan the printed document. Finally, scanning, with the scanner, an image disposed on the surface of the document.

OBJECTS OF THE INVENTION

It is, therefore, one of the primary objects of the present invention to provide a multifunctional hand held mobile communication device.

Another object of the present invention is to provide a multifunctional hand held mobile communication device that enables the user to scan printed media.

Yet another object of the present invention is to provide a multifunctional hand held mobile communication device that is capable of displaying the scanned image on a display.

A further object of the present invention is to provide a multifunctional hand held mobile communication device that is capable of storing the scanned image to a memory disposed therein.

Yet a further object of the present invention is to provide a multifunctional hand held mobile communication device that is capable of transferring the scanned image in a digital form to a remote location.

An additional object of the present invention is to provide a multifunctional hand held mobile communication device that is capable of capturing video and still images.

Another object of the present invention is to provide a multifunctional hand held mobile communication device that simplifies operational control of various functional features.

Yet another object of the present invention is to provide a multifunctional hand held mobile communication device that enables wireless person-to-person communication.

A further object of the present invention is to provide a multifunctional hand held mobile communication device that employs enhanced display capabilities.

Another object of the present invention is to provide a method of using the afore-described multifunctional hand held mobile communication device for managing printed documents.

In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

Figures 1, 2:
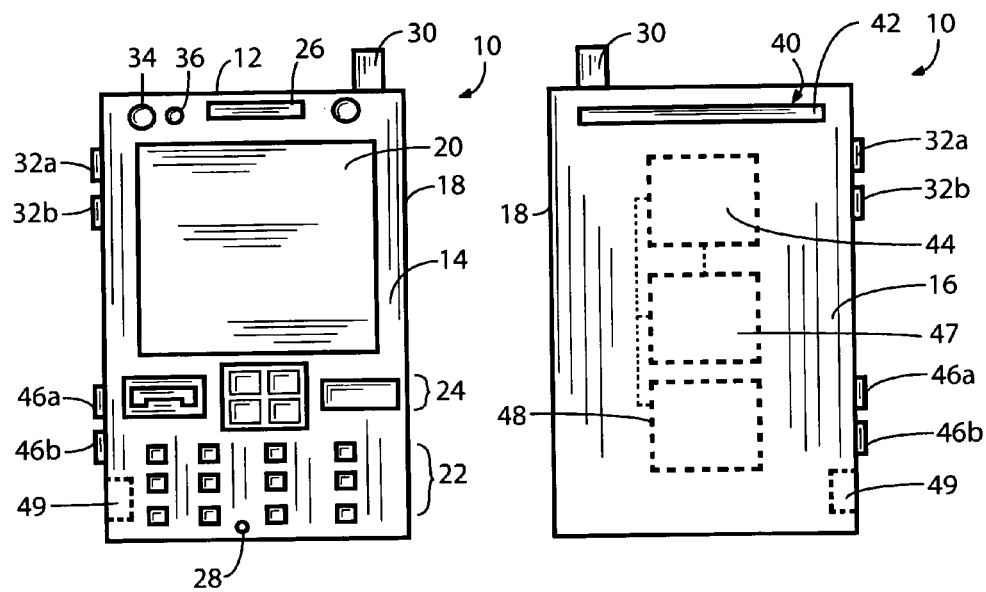
FIG. 1 is a front elevation view of a mobile communication device constructed in accordance with one embodiment of the present invention.
FIG. 2 is a rear elevation view of the mobile communication device of FIG. 1.
Figure 5:
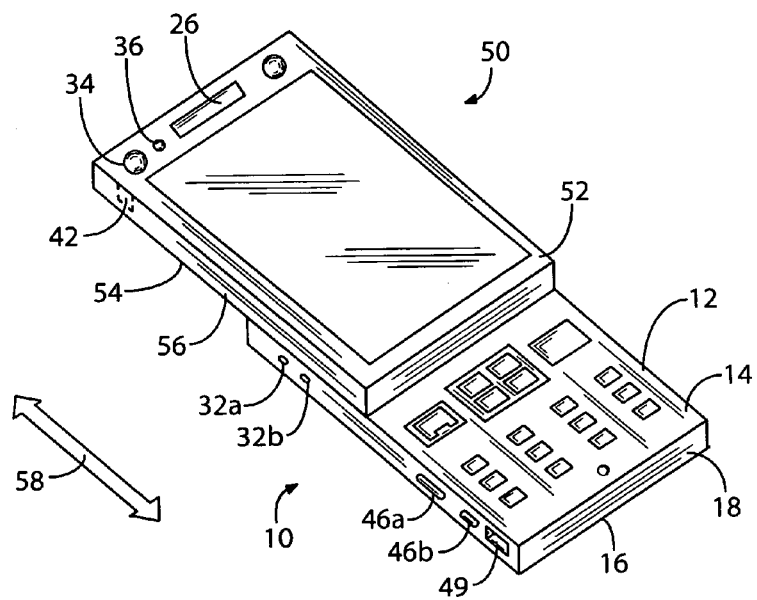
FIG. 5 is a perspective view of a mobile communication device constructed in accordance with another embodiment of the present invention.

BRIEF DESCRIPTION OF THE VARIOUS
EMBODIMENTS OF THE INVENTION

Prior to proceeding to the more detailed description of the present invention, it should be noted that, for the sake of clarity and understanding, identical components which have identical functions have been identified with identical reference numerals throughout the several views illustrated in the drawing figures.

It is to be understood that the definition of a hand held mobile communication device includes but is not limited to phones, personal digital assistants (PDAs), pagers, portable computers and the like devices.

It is also to be understood that the definition of a printed document includes but is not limited to newspapers, magazines, books, notes, photos, receipts, contracts, agreements, court documents, sketches, certificates, invoices, medical records, drawings, maps and the like.

The best mode for carrying out the invention is presented in terms of its presently preferred embodiment, herein depicted within FIGS. 1 through 8. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

Reference is now made, to FIG. 1-2, wherein there is shown a hand held mobile communication device, generally designated as 10, constructed in accordance with one embodiment of the invention. The device 10 includes a housing 12 having a first surface 14, an opposed second surface 16 and a peripheral edge 18. In a conventional manner, the device 10 includes a display 20, an alpha-numeric key pad 22 having a plurality of keys, a functional control key arrangement 24 having a plurality of functional control keys, a speaker 26, a microphone 28, antenna 30, volume adjustment controls 32*a* and 32*b* and camera 34 with a camera flash 36. The above components can be arranged and disposed on surfaces 14, 16 and peripheral edge 18 in any manner presently employed in a construction of hand held mobile communication devices. The display 20 may be of a conventional liquid crystal display (LCD) type. A battery (not shown) and a control circuit (not shown) are disposed internal to the housing 12.

An improvement to the device 10 includes a scanner means, generally designated as 40. The scanner means 40 may be a conventional bar code scanner. But, preferably, the scanner means 40 is of an optical character recognition type. For example, the scanner means 40 may be of the type disclosed in U.S. Pub. No. 2006/0284987 published on Dec. 21, 2006 to Wolf which is incorporated into this document by reference thereto. Although, any other scanner types and constructions are contemplated for use in the present invention. Accordingly, the scanner means 40 includes an image capturing member 42 which is provided on one of the first and second surfaces, 14 and 16 respectively, of the housing 12. The image capturing member 42 may be an optical diode array or a charge coupled device (CCD) capable of converting an optical image into an electronic signal. Preferably, such image capturing member 42 has an elongated shape for capturing a larger portion of a printed document 2. A software or firmware 44 is also provided and is disposed within the housing 12 for resolving or decoding the electronic signal in order to identify characters in the captured image and, if required convert the scanned image into editable text and/or graphical format. It is presently preferred for the software or firmware 44 to employ content editing program(s) in order to modify the converted text or graphics. By way of an example only, the text may be edited by a MICROSOFT WORD computer program running on the device 10 within the software or firmware 44. ON and OFF controls 46*a* and 46*b*, respectively, are also provided for operating the scanner means 40 and are preferably disposed on the peripheral edge 18 of the housing 12 for ease of activation by the user of the device 10.

Figure 3:
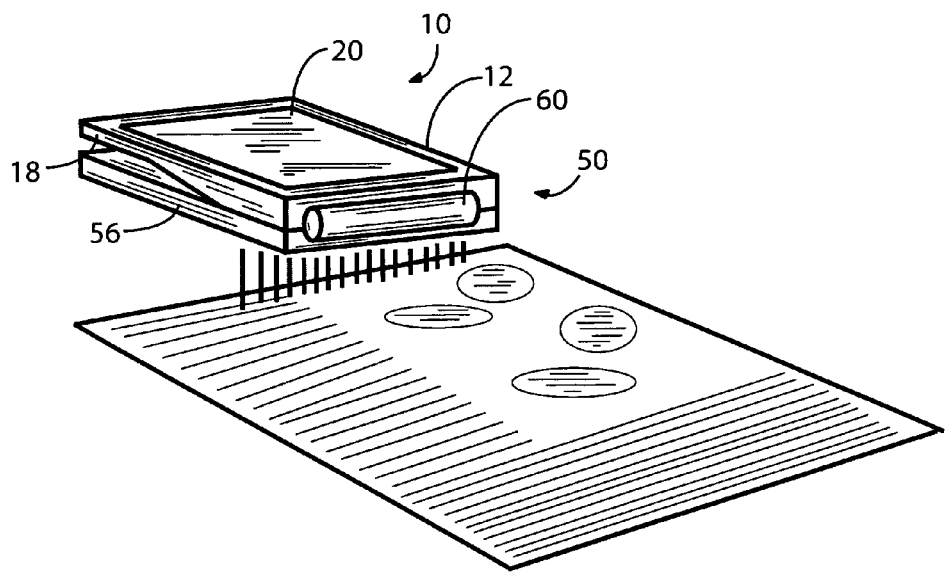
FIG. 3 is an environmental view of the mobile communication device positioned for scanning a printed document.
Figure 4:
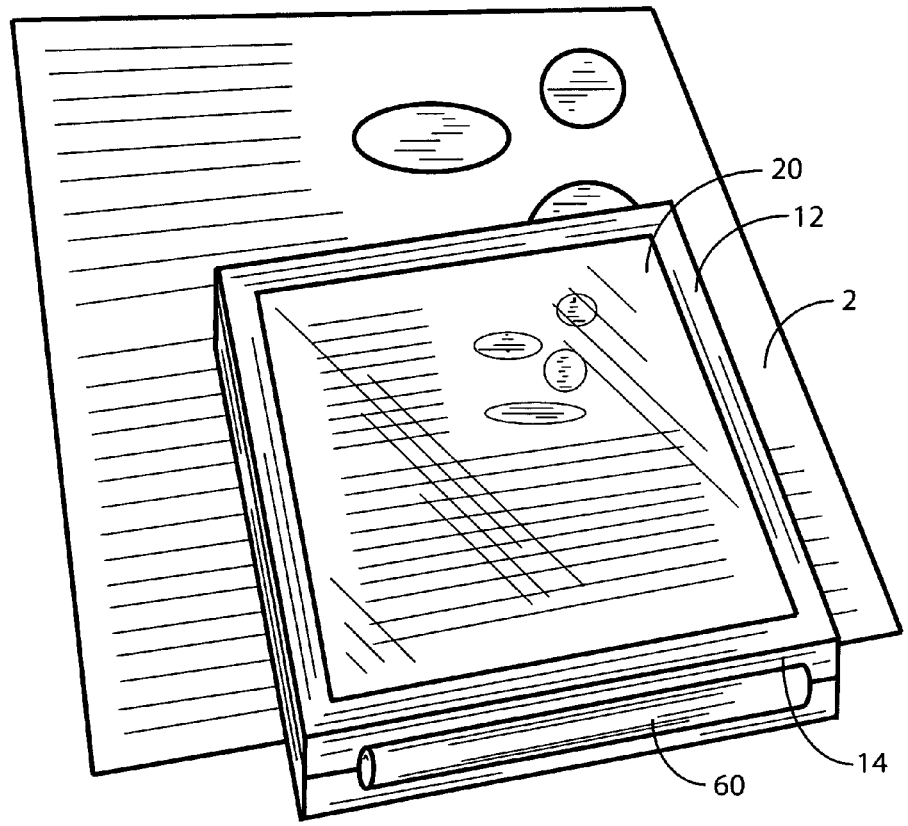
FIG. 4 is an environmental view of the mobile communication device of FIG. 4, particularly illustrating scanned image displayed on a display.

It has been found that in order to facilitate scanning of the document 2, the image capturing member 42 must be located on a surface of the housing 12 which is opposite to the surface having the display 20 provided thereon. By way of an example only of FIG. 1, the display 20 is provided on the first surface 14 adjacent the alpha-numeric keypad 22 and functional control key arrangement 24, while the image capturing member 42 is disposed on the second surface 16. Thus, the user using the device 10 will hold it with the second surface 16 oriented downwardly or away from the user, as best shown in FIGS. 3-4, and will be capable of directly viewing the image of the document 2 as it is being scanned on the first surface 14 being oriented upwardly or toward the user. It will be appreciated that the user can easily adjust the distance between the second surface 16 and the surface of the document 2 in order to capture such entire document surface by previewing the displayed scanned image prior to activating the image capturing member 42 to scan the document 2. It is also contemplated that the image of the document 2 being scanned is displayed in a real-time manner.

It is also within the scope of the present invention to move the device 10 along or across the surface of the document 2 in order to capture the image thereof. The display 20 oriented toward the user during scanning will be advantageous for visually informing the user when the scanning motion is too fast for image capture. If the user has to move the device 10 more than one time, capturing a portion of the document surface, the scanner means 40 will be adapted with a position sensing system, for example such as a navigation system 47, correlating the position of the device 10 relative to the document 2 and for synchronizing image capture with movement of the device 10 so that the complete image of the document 2 is produced. By way of an example only, such navigation system may be based on global positioning system (GPS) principles so that the user simply positions the device 10 in any one corner of the document 2 and may input, by way of the keypad 22 the size of the document 2 being scanned.

The present invention also contemplates that the scanned image can be stored internal to the device 10 within a memory storage module 48. It is also within the scope of the present invention to transfer the scanned image to a remote location either through a wireless connection through the antenna 30 or through a wired connection by providing a communication member, for example such as an universal serial bus (USB) socket 49. Such USB socket 49 will be also advantageous for downloading stored image to a computer or to a removable data storage device which is not shown but which is well known in the art.

In accordance with another embodiment of the present invention, the device 10 is provided with a second housing, generally designated as 50. Now in reference to FIG. 5 such housing 50 includes a first surface 52, an opposed second surface 54 and a peripheral edge 56. Such second housing 50 and the first housing 12 may be provided with a mechanism for enabling sliding movement of one housing relative to the other in a direction of an arrow 58. Such sliding mechanism is not shown but is well known in the art. By way of an example only, such sliding mechanism may be of the type disclosed in U.S. Pat. No. 7,162,283 issued to Bae et al. and whose teaching is incorporated into this document by reference thereto. It would be appreciated that employment of such sliding mechanism enables the device 10 to employ a larger size of the display 20 while conveniently and ergonomically positioning various elements of the device 10. By way of an example only of FIG. 5, the second housing 50 is provided as a lower housing and the housing 12 is provided as an upper housing. Display 20 may be then formed on the first surface 14 of the housing 12 with the key pad 22 and the functional control key arrangement 24 being positioned on the first surface 52 of the second housing 50 while the image capturing member 42 is positioned on the second surface 16 of the housing 12 adjacent to the upper end thereof so that it is exposed when the housings 12 and 50 are slid apart.

Figures 6, 7, 8:
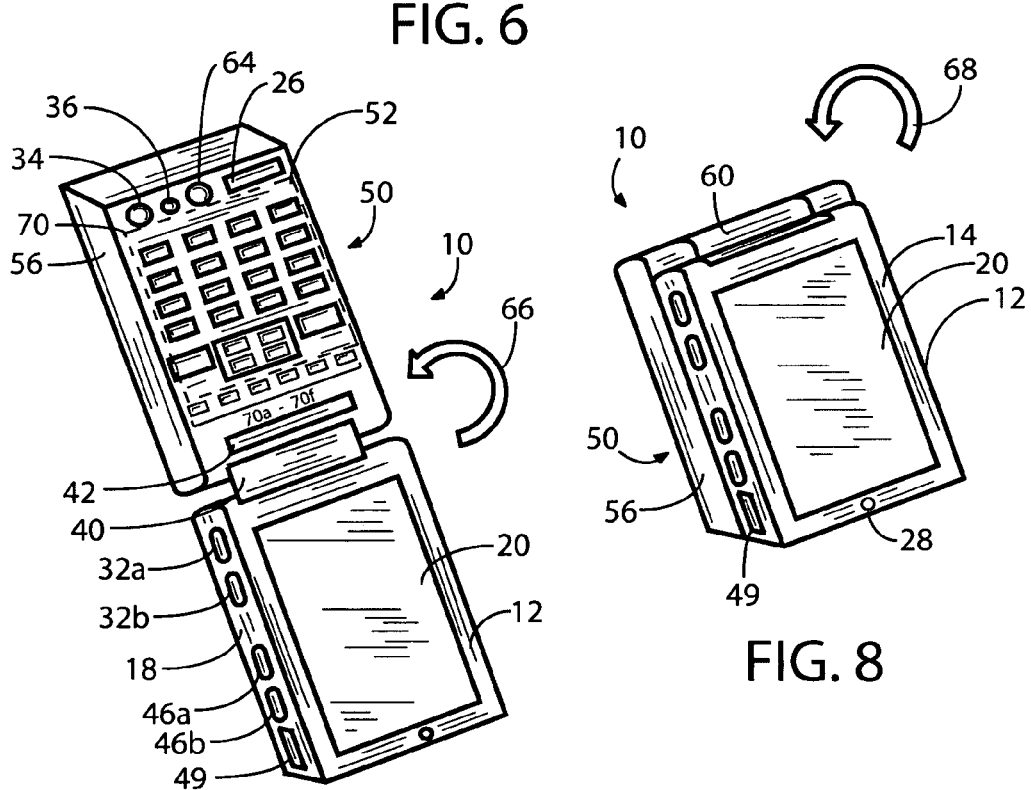
FIG. 6 is a perspective view of a mobile communication device constructed in accordance with a presently preferred embodiment of the present invention, particularly showing such device in a closed state.
FIG. 7 is a perspective view of the device of FIG. 6, particularly illustrating such device in a partially opened state.
FIG. 8 is a perspective view of the device of FIG. 6, particularly illustrating such device in a fully opened state.

Now, in accordance with a presently preferred embodiment of the invention, depicted in FIGS. 6-8, the adjacently disposed ends of each housing 12, 50 are connected with a hinge 60 enabling a 360 degree rotation of housings 12, 50 relative to one another. Then, the inner surfaces, such as the second surface 16 of the housing 12 and the first surface 52 of the housing 50 are invisible from outside in a closed state of the device 10, shown in FIG. 6, and the outer surfaces, such as the first surface 14 of the housing 12 and the second surface 54 of the housing 50 are invisible from outside in a fully opened state of the device 10, shown in FIG. 8.

The hinge 60 may be of a type disclosed in U.S. Pat. No. 7,155,266 issued to Stefansen or in U.S. Pat. No. 5,568,820 issued to Dirksing. Teachings of U.S. Pat. No. 7,155,266 and U.S. Pat. No. 5,568,820 are incorporated herein by reference thereto.

It is further preferred to position the image capturing member 42 on the first surface 14 of the second housing 12 and in close proximity to the hinge 60. Accordingly, the display 20 is then positioned on the first surface 14 of the housing 12 so that when the housings 12 and 50 are in open state and the device 10 is in use, the image capturing member 42 is oriented downwardly for scanning the document 2 and the display 20 is oriented upwardly for ease of viewing scanned images by the user. When the housings 12 and 50 are in closed state shown in FIG. 6, the image capturing member 42 is invisible from outside and is protected from damages. In such embodiment, the key pad 22 and the functional key arrangement 24 may be positioned on the first surface 52 of the second housing 50. Thus, the device 10 can be conveniently used for mobile communication purposes when the housing 50 is partially rotated from the hosing 12 in direction of arrow 66, as best shown in FIG. 7. The second housing 50 is then rotatable in a direction of the arrow 68 so that the device 10 is in the fully opened position. It is contemplated that the key pad 22 and the functional key arrangement 24 may be positioned on the second surface 16 of the housing 12 so that the second display 22 may be used for mobile communication purposes when the device 10 is partially opened. It is also contemplated that the key pad 22 and the functional key arrangement 24 may be positioned on different surfaces of the device 10.

The present invention also provides for a second display 62 which is disposed on the second surface 54 of the second housing 50 so that when the device 10 is in the closed state, the second display 62 is visible from outside. Preferably, the size of the second display 62 is generally equal to the size of the display 20, and both being as large as possible within the peripheral constraints of the device 10.

It is also contemplated that a third display 70 may be provided on the second surface 16 of the housing 12 or on the first surface 52 of the second housing 50 for enhanced display capabilities. For example, positioning such third display 70 on the first surface 52 of the second housing 50 may be advantageous for performing two activities at the same time purposes, for example the user may employ the display 20 for scanning purposes, while employing such third display 70 for text messaging or e-mails.

The present invention further overcomes disadvantages of the prior art mobile communication devices by providing both the camera 34 capable of capturing still images and a video camera 64 for capturing video images. Thus, the device 10 provides greater functionality relative to prior art hand held mobile communication devices.

The present invention also provides plurality of feature operating keys 70a-70f, each programmed to directly operate a unique feature of the device 10 in a single step manner by activating a respective operating key. It is presently preferred to provide a dedicated key for operating scanner means 40, camera 34, video camera 64, as well as store scanned images, establish a wireless data transfer links and send and receive e-mails. Thus, the user is able to avoid browsing through the conventional menu in order to activate the above described features of the device 10.

It will be appreciated that the device 10 overcomes disadvantage of the prior art portable or hand held document managing devices. The scanner means 40 is integrated into a convention mobile communication device carried practically by everyone, particularly by business professionals tasked with handling printed documents for a variety of reasons. Thus, such device 10 is readily available for scanning documents 2 eliminating the effort required by the user to locate and access a stationary image scanner (not shown) or position and hook-up a portable image scanner (not shown) for use. It is within the scope of the present invention to operate the scanner means 40 independently from using the wireless capabilities of the device 10 by simply using one of the operating keys 7a-70f, dedicated for operating the scanner means 40. Thus, the user will be able to use the scanner means 40 in an environment, for example as an airplane (not shown), wherein the use of the wireless communication devices is presently prohibited.

The device 10 of the present invention is also capable of transmitting scanned images to a remote location 4 in either wireless manner, for example as an attachment to an e-mail, or a wired manner through USB socket 49. Thus, the user requiring additional review from remotely disposed personnel is enabled to transmit scanned images in a real time manner and receive a prompt response from the recipient(s) of such scanned images. For example, the user of the device 10 tasked with signing a contract can simply, quickly and without any assistance scan the contract and transmit it, by way of an e-mail for review prior, and receive feedback prior to signing the printed document 2. If required, the user can also modify the content of the scanned document 2 within the device 10 and transmit it, by way of the e-mail or the USB connection, to the computer 6 of the other signing party for printing and further handling of the document. Providing displays 20 and 70 positioned in a side-by-side relationship is advantageous in this example for comparing the original document and the received feedback each displayed on a respective display 20, 70.

Capability to modify the scanned images within the device 10 also enables the user to enhance quality of the scanned image or modify content prior to transmittal or storage.

Although the presently preferred embodiment of the invention has been shown in terms of arranging the various elements of the mobile communication device in accordance with FIGS. 6-8, it will be apparent to those skilled in the art, that such various elements may be arranged differently according to specific application requirements. For example, the functional keys 24 may be disposed on the first surface 14 of the housing 12 so as to facilitate the use of the device 10 as a mobile phone terminal.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

I claim:

1. In combination with a hand held mobile electronic communication device having a housing, an improvement comprising:
    (a) a scanner integrated into said housing and having an image capturing member disposed on one surface of said housing;
    (b) a display provided on an opposed surface of said housing, whereby an image being scanned by said scanner is displayed on said display and is viewable during a scanning effort by a user positioned to directly view said opposed surface; and
    (c) a navigation system having means adapted to at least one of correlate position of said device relative to said image being scanned, synchronize image capture with movement of said device across said image being scanned so as to generate complete scanned image and input size of said image being scanned.

2. The device, according to claim 1, wherein said scanner is one of a barcode scanner and an optical character reader.

3. The device, according to claim 2, wherein said scanner is said optical character reader.

4. The device, according to claim 1, wherein said device includes means disposed therein for transferring said scanned image to a remote location.

5. The device, according to claim 4, wherein said image transfer means includes a communication port provided on said housing.

6. The device, according to claim 1, wherein said device includes means disposed therein for modifying said scanned image.

7. A hand held mobile communication device comprising:
    (a) a first housing;
    (b) a second housing
    (c) a hinge means pivotally connecting said first and second housing and enabling a 360 degree rotation relative to one another, wherein inner surface of said first and second housing being invisible from outside in a closed state of said device, and wherein outer surface of said first and second housing being invisible from outside in an open state of said device;
    (d) a scanner integrated into one of said first and second housings and having an image capturing member disposed on an inner surface of said one of said first and said second housing; and
    (e) a display screen provided on an inner surface of an opposed one of said first and said second housing, whereby an image being scanned by said scanner is displayed on said display screen when said first and second housings are in said open state and wherein said image being scanned is viewable during scanning effort by a user positioned to directly view said inner surface of said opposed one of said first and said second housing.

8. The device according to claim 7, wherein said device includes a second display screen.

9. The device according to claim 8, wherein said second display screen is provided on an outer surface of said opposed one of said first and said second housing, wherein a size of said second display is generally identical to a size of said display screen.

10. The device, according to claim 7, wherein said device includes a plurality of operational keys each directly operating a distinct function of said device in a one step operation and wherein one of said plurality of functional keys operates said scanner to scan said image and wherein another one of said pluralities of operational keys saves said scanned image to a memory disposed within said device in said one step operation.

11. The device, according to claim 7, wherein said device further includes means provided on said housing for transferring said scanned image to a remote location.

12. The device, according to claim 7, wherein said device includes a first camera for capturing still images and a second camera for capturing video.

13. A method of managing printed documents, said method comprising the steps of:
    (a) providing a scanner in a hand held mobile electronic communication device having a display disposed on one surface thereof, said scanner integrated into said device and having an image capturing member disposed on an opposed surface of said device;
    (b) positioning said scanner at a predetermined distance above a printed document to be scanned;
    (c) activating said scanner to scan said printed document;
    (d) scanning, with said scanner, an image disposed on said surface of said document;
    (e) displaying said image being scanned on said display; and
    (f) viewing, by a user positioned to directly view said one surface of said device, said scanned image being displayed in step (e).

14. The method, according to claim 13, wherein said method includes the additional step of saving said scanned image to a memory disposed within said device.

15. The method, according to claim 13, wherein said method includes the additional step of transferring said scanned image to a remote location.

16. The method, according to claim 13, wherein said method includes the additional step of editing, with a computer program, said scanned image displayed on said display.

17. The method, according to claim 13, wherein said method includes the additional step of previewing said image to be scanned on said display.

18. In combination with a hand held mobile electronic communication device having at least one housing, an improvement comprising:
    (a) a scanner integrated into said at least one housing and having an image capturing member disposed on one surface of said at least one housing;
    (b) a display provided on an opposed surface of said at least one housing, whereby an image being scanned by said scanner is displayed on said display and is viewable during a scanning effort by a user positioned to directly view said opposed surface; and (c) a plurality of operational keys each directly operating a distinct function of said device in a one step operation and wherein one of said plurality of functional keys operates said scanner to scan said image and wherein another one of said pluralities of operational keys saves said scanned image to a memory disposed within said device in said one step operation.

* * * * *